Patented Sept. 14, 1926.

1,599,650

UNITED STATES PATENT OFFICE.

ROBERT K. COONEY, OF HOMER, MICHIGAN, ASSIGNOR, BY DIRECT AND MESNE ASSIGNMENTS, TO CAMPBELL-COONEY PATENTS CO., OF HOMER, MICHIGAN, A CORPORATION OF MICHIGAN.

CREAM-TREATING PROCESS.

No Drawing.    Application filed September 28, 1925. Serial No. 59,041.

REISSUED

It is common practice for creameries to purchase or receive cream from various producers from whom the cream is received in various conditions as to acidity and care. It is not possible to handle these small batches separately in creamery processes and such cream must be mixed and used in the making of butter. The result is that the butter made from such cream is not uniform and the cream cannot be used for any other purpose.

The objects of my improved process are:

First, to provide an improved method of treating cream whereby a uniform product may be produced which may be used for making ice cream and other purposes where fresh sweet cream is ordinarily required.

Second, to provide an improved method of treating cream whereby the same is rendered entirely wholesome and remains in wholesome condition for a considerable period.

Third, to provide an improved butter making process which enables the production of a very uniform product.

Objects pertaining to details and economies of my improved process will definitely appear from the detailed description to follow. The invention is clearly defined and pointed out in the claims.

The cream as delivered or collected from various producers may be mixed or placed in a common receptacle as desired. Cream so collected is of varying degrees of acidity, not only as to different batches but as affected by weather conditions.

To the cold cream, that is, cream that is unheated or at atmospheric temperature, I add an alkaline neutralizer, preferably soda ash. The neutralizer is introduced in the form of a solution and stirred in and allowed to act from ten to twenty minutes, or longer as may be required, depending on the extent to which it is desired to reduce the acidity. I have found in practice that one gallon of soda solution to 400 pounds of cream produces satisfactory results, the soda ash solution being prepared in the proportion of one pound of soda ash to one gallon of water and the soda ash being about 60% alkali.

After the neutralizer has been allowed to act for the desired period while the cream is cold, the cream is Pasteurized, being preferably raised to a temperature of about 150° F. The Pasteurized cream while still at approximately Pasteurizing temperature is then passed through a centrifugal clarifier by which the solids, largely of curd and foreign matter, are removed.

After passing through the centrifugal clarifier the cream is passed while still heated through a centrifugal separator by which the cream is removed from other liquids, including the liquids formed by the reaction of the neutralizing agent. I prefer to use an alkaline neutralizer such as soda ash as it acts to dissolve the curd and the resultant of the neutralizer is in liquid form. This is effectively removed by the centrifugal separator. A percentage of the solids is removed by the separator as I have found no clarifier which removes all of them. The soda ash is very satisfactory as it serves to dissolve the curds and reactions of the neutralizer in liquid form are removed by the separator without carrying any substantial amount of butter fat therewith. Further, the machines are not likely to become clogged by the solids.

As the cream is delivered from the separator it contains a high percentage of butter fat. It is reduced to the desired percentage by the addition of sweet milk, either whole or skimmed, as may be desired, the milk being added while the cream is hot, preferably prior to cooling. If it should be materially cooled after passing through the separator it is preferably reheated, as it is found that the milk will mix with the cream more effectively while the cream is hot.

It is found in practice that when cold cream is allowed to stand with a neutralizer added until its acidity is about .22%, after passing through the clarifier its acidity is reduced to about .18%, and after passing through the separator its acidity is about .12%.

It is also found that when the cream is passed from the Pasteurizer at approximately 150° F., it issues from the clarifier at approximately 144° F., and when immediately passed from the separator it issues therefrom at a temperature of about 138° F.

The treated cream may be used for any purpose for which fresh or sweet cream may be used. It is wholesome and of good keeping qualities, although if allowed to stand it will become acid as does untreated cream, and may be used for butter making by allowing the desired acidity to be developed, or, this may be hastened by the addition of a suitable culture. It is necessary, however, to reduce or standardize the cream when it is used for butter making and this should be done prior to adding of the culture. Butter of very superior and uniform quality may be produced. The flavor is under the control of the butter maker as the degree of acidity or the amount of lactic acid developed is easily controlled by the operator.

While I have quite specifically defined the steps as employed by me in practice, these may be considerably varied with satisfactory results to meet varying operating conditions in the creamery or apparatus.

While I prefer to use both a centrifugal clarifier and centrifugal separator, a single centrifugal machine or machines of one type may be used with quite satisfactory results, but greater care must be exercised and the machines are more likely to become clogged.

Having thus described my invention what I claim as new and desire to secure by Letters Patent is:

1. The process of treating cream of high acidity consisting of adding a solution of soda ash as a neutralizing agent to unheated cream and permitting the neutralizer to act while the cream is unheated, Pasteurizing, passing through a centrifugal clarifier while at approximately Pasteurizing temperature for removing solids, passing while still heated through a centrifugal separator whereby substantially all liquid formed by the reaction of the neutralizing agent is removed, and reducing while heated to the desired percentage of butter fat by the addition of milk.

2. The process of treating cream of high acidity consisting of adding a solution of soda ash as a neutralizing agent to unheated cream and permitting the neutralizer to act while the cream is unheated, Pasteurizing, passing through a centrifugal clarifier while at approximately Pasteurizing temperature for removing solids, and passing while still heated through a centrifugal separator whereby substantially all liquid formed by the reaction of the neutralizing agent is removed.

3. The process of treating cream consisting of adding to unheated cream a neutralizing agent acting to reduce the acidity and dissolve the curds, Pasteurizing, subjecting to a centrifugal clarifying machine for removing solids, and subjecting to a second centrifugal machine for separating the cream from other liquids.

4. The process of treating cream consisting of adding to unheated cream a neutralizing agent acting to reduce the acidity and dissolve the curds, Pasteurizing, and subjecting to a centrifugal machine for separating the cream from other liquids.

5. The process of treating cream of high acidity consisting of adding a neutralizing agent, the resultant of which is in the form of a liquid, Pasteurizing, and successively subjecting while heated to a centrifugal machine for removing the solids and to a second centrifugal machine for separating the cream from the liquids.

6. The process of treating cream of high acidity consisting of adding to unheated cream a neutralizing agent, Pasteurizing, passing through a centrifugal clarifier while at approximately Pasteurizing temperature, and passing while still heated through a centrifugal separator.

7. The process of treating cream consisting of adding an alkaline neutralizing agent while the cream is cold, Pasteurizing, and subjecting to a centrifugal machine whereby the liquid formed by the reaction of the neutralizing agent is removed.

8. The process of treating cream of high acidity consisting of adding a neutralizing agent to reduce the acidity while the cream is cold, Pasteurizing, and subjecting while at approximately Pasteurizing temperature to a centrifugal machine whereby the cream is freed from the liquid formed by the reaction of the neutralizing agent.

In witness wherof I have hereunto set my hand.

ROBERT K. COONEY.